US009908156B2

(12) United States Patent
Conrad et al.

(10) Patent No.: US 9,908,156 B2
(45) Date of Patent: Mar. 6, 2018

(54) PACKAGING CONCEPT FOR SOLID PRODUCTS

(71) Applicant: Ecolab USA Inc., St. Paul, MN (US)

(72) Inventors: Gregory Scott Conrad, Vadnais Heights, MN (US); Sarah Elise Gilbertson, St. Paul, MN (US); Scott R. Limback, St. Paul, MN (US); Daniel Osterberg, White Bear Township, MN (US); Gretchen King, Rosemount, MN (US); Jeffrey Michael Schultz, Hudson, WI (US); Peter Swenson, Cottage Grove, MN (US); Timothy Meier, Eagan, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 15/130,336

(22) Filed: Apr. 15, 2016

(65) Prior Publication Data

US 2016/0303614 A1 Oct. 20, 2016

Related U.S. Application Data

(60) Provisional application No. 62/316,688, filed on Apr. 1, 2016, provisional application No. 62/148,463, filed on Apr. 16, 2015.

(51) Int. Cl.
*B01D 11/02* (2006.01)
*B08B 3/08* (2006.01)
(Continued)

(52) U.S. Cl.
CPC .............. *B08B 3/08* (2013.01); *B01F 1/0022* (2013.01); *B01F 1/0033* (2013.01);
(Continued)

(58) Field of Classification Search
CPC ................................ B08B 3/08; B01F 1/0022
See application file for complete search history.

(56) References Cited

U.S. PATENT DOCUMENTS 4,267,928 A * 5/1981 Curry, Jr. ................. A23B 4/00 206/497
5,007,559 A * 4/1991 Young ................... B01F 1/0027 222/1

(Continued)

FOREIGN PATENT DOCUMENTS

CN 2346713 Y 11/1999

OTHER PUBLICATIONS

Ecolab USA Inc., PCT/US2016/027791 filed Apr. 15, 2016, "The International Search Report and the Written Opinion of the International Searching Authority, or the Declaration", dated Aug. 3, 2016.

*Primary Examiner* — Kevin Joyner
(74) *Attorney, Agent, or Firm* — McKee, Voorhees & Sease, PLC

(57) ABSTRACT

A device for packaging and dispensing a chemical product is provided. The device may include a first portion connected to a second portion. Counterpoising locking features may secure the first portion and the second portion. A support member is disposed within the lower portion and adapted to support the product. The device may include a flexible enclosure contoured to and enclosing the rigid body and the product. The flexible enclosure may enclose a portion of the housing and the product, after which heat is applied to shrink the flexible enclosure. A handle may provide for ease of installation and/or removal of the device from a solid chemical dispensing system.

15 Claims, 18 Drawing Sheets

(51) Int. Cl.

| | |
|---|---|
| ***B01F 1/00*** | (2006.01) |
| ***B05B 9/01*** | (2006.01) |
| ***B65B 53/02*** | (2006.01) |
| ***B65D 25/28*** | (2006.01) |
| ***B65D 41/02*** | (2006.01) |
| ***B65D 25/10*** | (2006.01) |
| ***B01F 5/02*** | (2006.01) |

(52) U.S. Cl.
CPC .............. *B01F 5/0268* (2013.01); *B05B 9/01* (2013.01); *B65B 53/02* (2013.01); *B65D 25/10* (2013.01); *B65D 25/101* (2013.01); *B65D 25/2802* (2013.01); *B65D 25/2826* (2013.01); *B65D 41/02* (2013.01)

(56) References Cited

U.S. PATENT DOCUMENTS

| | | | | |
|---|---|---|---|---|
| 5,086,952 | A | 2/1992 | Kryk | |
| 5,627,150 | A * | 5/1997 | Peterson | A47L 15/4436 206/515 |
| 5,759,501 | A | 6/1998 | Livingston et al. | |
| 5,853,034 | A * | 12/1998 | Edwards | B67D 1/0015 141/100 |
| 5,915,622 | A | 6/1999 | Foote | |
| 5,971,645 | A | 10/1999 | Fukushima et al. | |
| 2004/0200797 | A1 * | 10/2004 | Hicks | B65D 41/0421 215/305 |
| 2008/0107576 | A1 * | 5/2008 | Zettlitzer | A47L 15/4436 422/266 |

* cited by examiner

PACKAGING CONCEPT FOR SOLID PRODUCTS

CROSS-REFERENCE TO RELATED APPLICATIONS

This application claims priority under 35 U.S.C. § 119 of provisional application Ser. Nos. 62/148,463 filed Apr. 16, 2015, and 62/316,688 filed Apr. 1, 2016, all of which are herein incorporated by reference in their entirety.

FIELD OF THE DISCLOSURE

The present disclosure relates generally to the packaging and dispensing of solid chemical agents. More particularly, but not exclusively, the present disclosure relates to a device and method for safely deploying solid chemical products for use in cleaning processes.

BACKGROUND OF THE DISCLOSURES

Most cleaning processes use some form of cleaning product such as soaps, detergents, and other chemical agents and materials. The cleaning products are made in a variety of forms, including solids, liquid, powders, sprays, granules, and the like. Solid products may be beneficial over liquids, powders, and/or sprays for a variety of reasons. For example, the solid products can be colorized for identification and/or use, and the solid products can be shaped to only fit in certain applications. The color coating and/or shaping of the solid products aids in ensuring that the proper product is used for the corresponding use. For example, the solid products can be pellets or extruded solid blocks.

In cleaning systems utilizing solid chemical products, the solid chemical product can be dissolved using liquid sprayed from a spray nozzle. The spray nozzle typically is located beneath the chemical product and sprays liquid into the underside of the chemical product. The spray nozzle may be configured to produce a jet of water of sufficiently wide angle to contact the entire underside of the chemical product for even dissolution. To allow for the angled jet of water to sufficiently develop, it is desirable to keep the product at a specified distance from the spray nozzle. Doing so maintains consistent concentration levels and dispensing rate through the life of the chemical product.

The solid chemical product often rests on a screen or mesh-like device, through which the jet of water is passed. The screen in most cleaning systems, however, is mounted or integral to the cleaning system unit. Over time the screen may become partially or completely clogged, significantly reducing the efficacy of the overall cleaning system. In such instances, a user may be required to clean chemical product from the screen, thereby again presenting an opportunity for adverse human interaction. Similarly, if a solid chemical product is not completely dissolved and a user wishes to replace the solid chemical product (e.g., with a new type or formula of solid chemical product), the user must either manually remove the remaining chemical block and/or install a new chemical block on top of the old one. The former presents yet another opportunity for adverse human interaction. The latter reduces the efficiency of the system via uneven dissolution and possibly results in an undesirable mixture of chemical cleaning agents.

Therefore, a need exists in the art for an improved device and method that maintains a specified distance between the solid chemical product and the spray nozzle while providing for ease and safety of installation and/or replacement of the solid chemical product.

SUMMARY OF THE DISCLOSURE

It is therefore a primary object, feature, and/or advantage of the present disclosure to improve on or overcome the deficiencies in the art.

It is another object, feature, and/or advantage of the present disclosure to provide a device and method to mitigate user exposure to chemical products in cleaning processes.

It is yet another object, feature, and/or advantage of the present disclosure to provide a device that maintains a specified distance between the solid chemical product and the spray nozzle in a solid chemical dispensing system.

It is still yet another object, feature, and/or advantage of the present disclosure to provide a device that is easy and inexpensive to manufacture, install, and replace.

It is a further object, feature, and/or advantage of the present disclosure to provide an apparatus that can be configured to efficiently obtain and maintain a desired solution concentration.

It is still a further object, feature, and/or advantage of the present disclosure to provide a device or apparatus that includes a product that can quickly and safely load the product into a dispensing system.

These and/or other objects, features, and advantages of the present disclosure will be apparent to those skilled in the art. The present disclosure is not to be limited to or by these objects, features and advantages. No single embodiment need provide each and every object, feature, or advantage.

BRIEF DESCRIPTION OF THE DRAWINGS

Illustrated embodiments of the present disclosure are described in detail below with reference to the attached drawing figures, which are incorporated by reference herein, and where.

Figure 1:
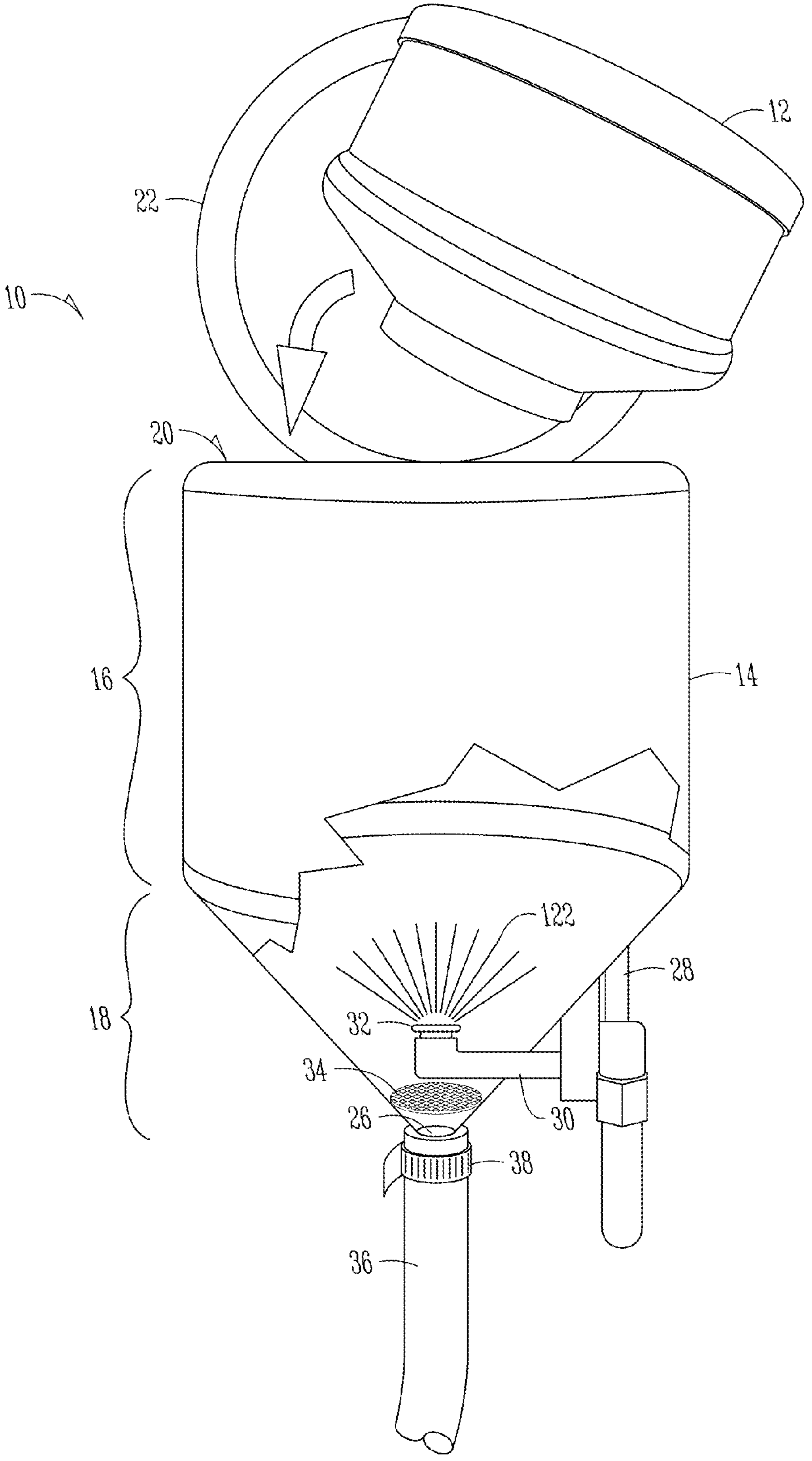
FIG. 1 is a front perspective view of a dispensing system for solid chemical product in accordance with an illustrative embodiment.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE DISCLOSURE

For particularly demanding industrial cleaning applications, caustic materials (e.g., caustic soda, sodium hydroxide, caustic potash, or potassium hydroxide) provide several advantages. When combined with water and heated, caustic products are often used as a powerful degreaser on stainless steel, glass bakeware, ovens, parts washers, process equipment, drain decloggers, and the like. The caustic solution can dissolve oils, fats and protein-based deposits. Further, surfactants can be added to the caustic solution to stabilize dissolved substances and thus prevent redeposition. Still further, the caustic solution is considered to be an environmental improvement over solvent-based cleaning methods.

Despite numerous advantages, the caustic materials have high alkalinity and are highly corrosive. The materials are corrosive to human flesh and flammable when in contact with organic solvents. Therefore, minimizing, or preferably eliminating a user's interaction with the caustic materials is of utmost importance.

The caustic products often are manufactured in solid, extruded blocks. The blocks are installed into cleaning systems. One such cleaning system is disclosed in U.S. Pat. No. 4,690,305 to Copeland, which is incorporated by reference herein in its entirety. Copeland discloses housing the solid chemical product in a container with a removable lid. The lid is removed and the container is inverted over the dispenser, after which the solid block falls into the dispenser. The method presents an opportunity for adverse human contact with the solid chemical product, however. Further, the descending solid block may not rest in the container as designed, requiring adjustment and further inviting the possibility of adverse human interaction. Therefore, a need exists in the art for an improved device and method to eliminate the potential for unwanted user exposure to the chemical product prior to and after use.

Figure 2:
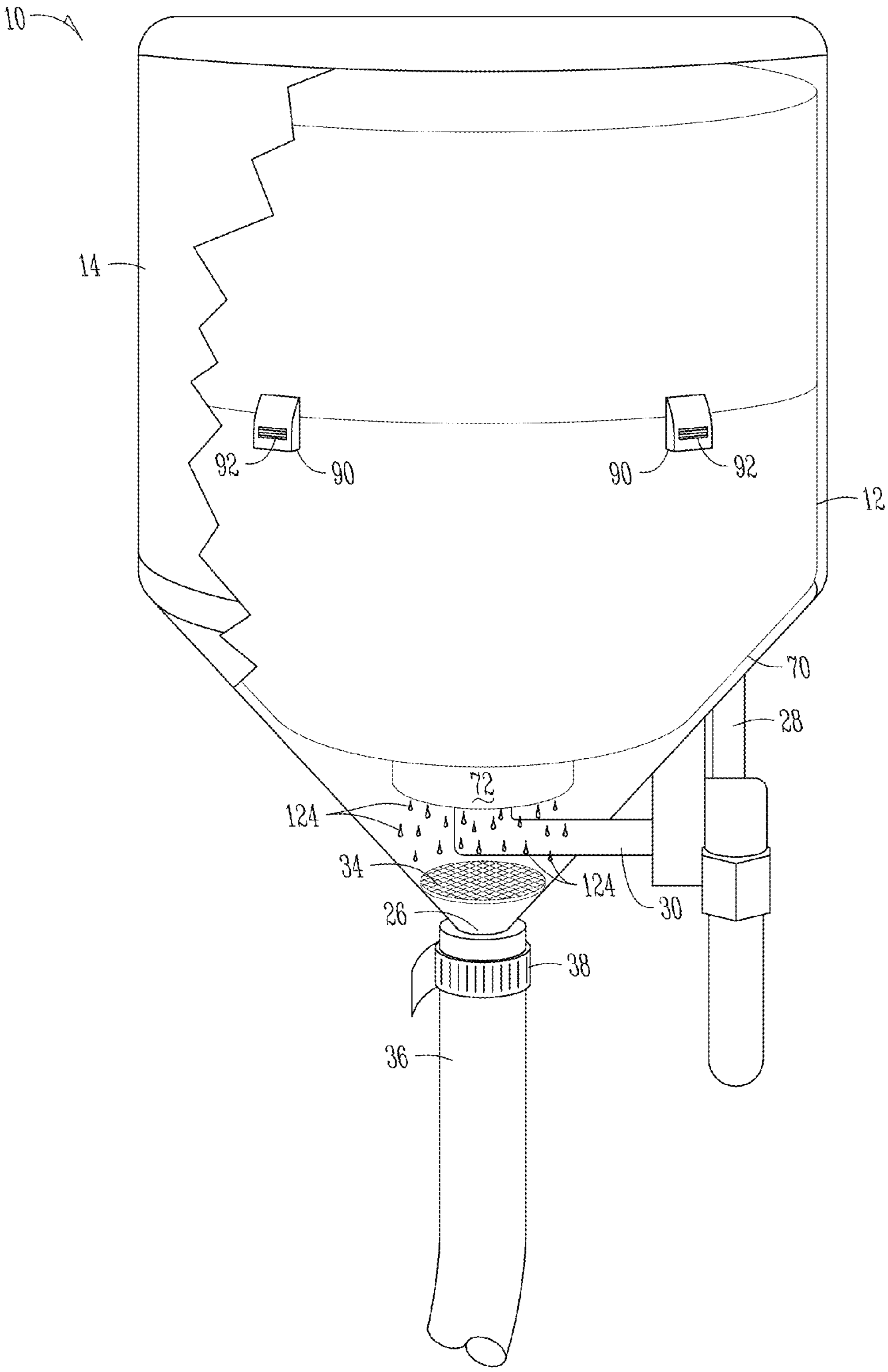
FIG. 2 is a front perspective view of a dispensing system for solid chemical product in accordance with an illustrative embodiment.

FIG. 1 illustrates a cleaning system 10 adapted to dispense a solid chemical product from a device 12 comprising an embodiment of the present disclosure. The cleaning system 10 includes a container 14 having an upper portion 16 and a lower portion 18. The upper portion 16 may be cylindrical, as illustrated, or of any suitable shape to house the device 12. The upper portion includes an opening 20 through which the device 12 is installed. A lid 22 may be operably or removably connected to the upper portion 16 of the container 14 to enclose the system 10 during operation. The lower portion 18 may be conical or the frustum of a cone. The shape advantageously creates an interference fit between the device 12 and the container 14 and also permits the solution to drain into an opening 26 within the bottom of the lower portion 18, as shown illustratively in FIG. 2.

The system 10 further includes a water line 28, an inlet pipe 30 extending between the water line 28 and the lower portion 18, a spray nozzle 32, an outlet screen 34, and a discharge tube 36. A clamp 38 may secure the discharge tube 36 to the lower portion 18 of the container 14. Other clamping means are envisioned, including barbs, friction fit, interference fit, pinning, threading, and the like. The operation of the system 10 will be discussed in detail below.

It is noted that the screen 34 can be positioned at a constant distance or position from the spray nozzle and/or the solid product. This aids in providing safety for the user. The screen 34 is also not needed in all embodiments, such as when a dissolving/eroding method besides spraying is utilized (e.g., flooding) or for specific solid chemical formulas. Furthermore, the screen 34 can also be identified as a support member, such as when the screen is used to support the solid chemical product. For example, during transport of the device 12 with a product stored therein, the screen could provide a support for the product such that, even if the product were to break, it would still be supported by the screen so that the product remains in a preferred position within the device for use at its final location. While the screen is shown with a general lattice pattern, other types of screens with generally any type of apertures therethrough could be utilized. One embodiment of the support member 34 besides the screen could be a built-in ring support. The ring support member could be a ledge, flange, portion of the housing, or other portion of the device 12 that extends substantially horizontally to provide a surface or area for the product to at least partially rest on. The size of the support ring could vary depending on the makeup of the solid chemical product so as to provide the same benefits as disclosed with regard to the screen support member 34. Furthermore, it should be appreciated that the location of the support member or screen 34 can be changed to accommodate different types of products, erosion methods, and other factors.

Figure 3:
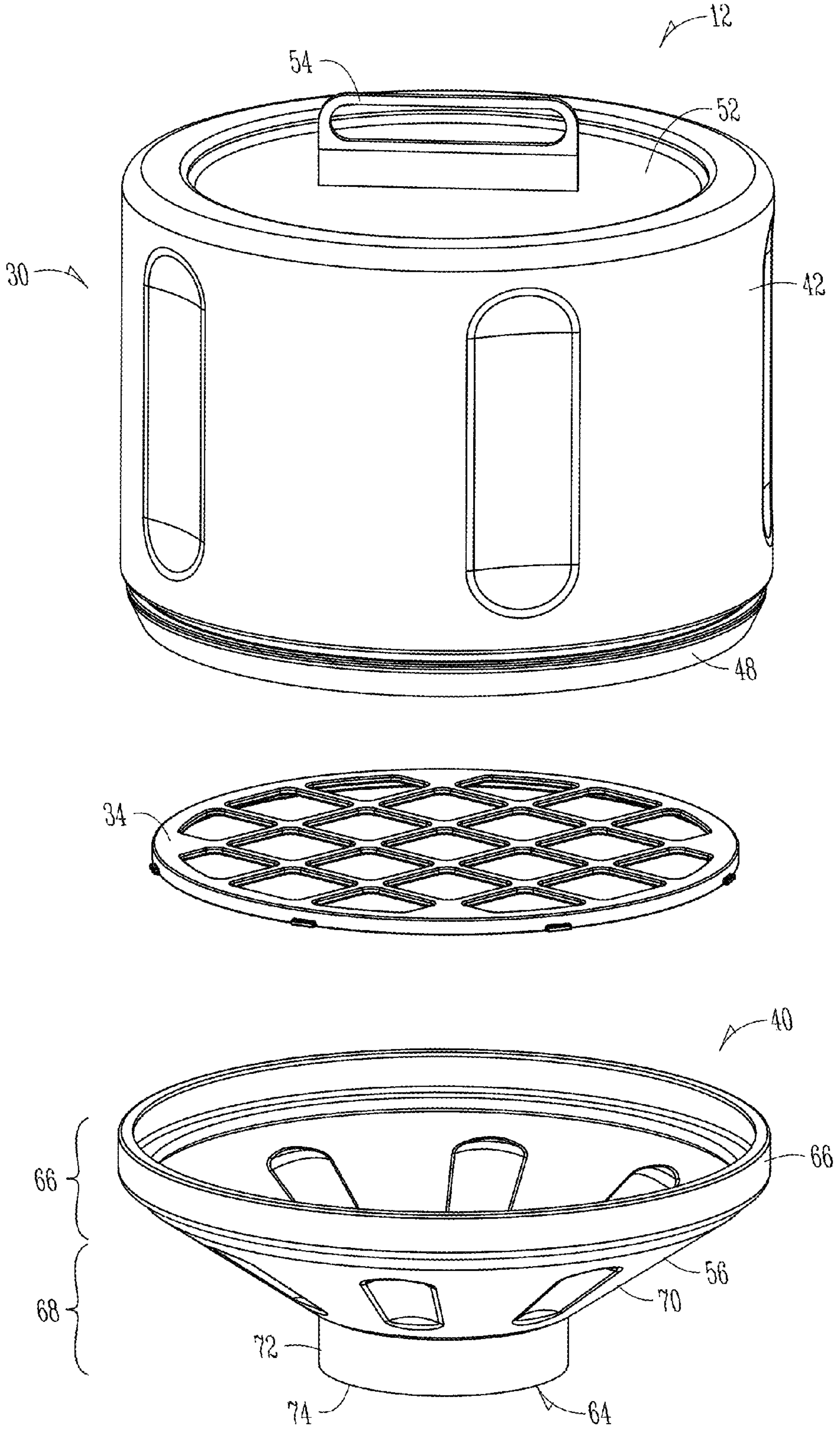
FIG. 3 is an exploded view of a device for packaging and dispensing a product in accordance of an illustrative embodiment.
Figure 4A:
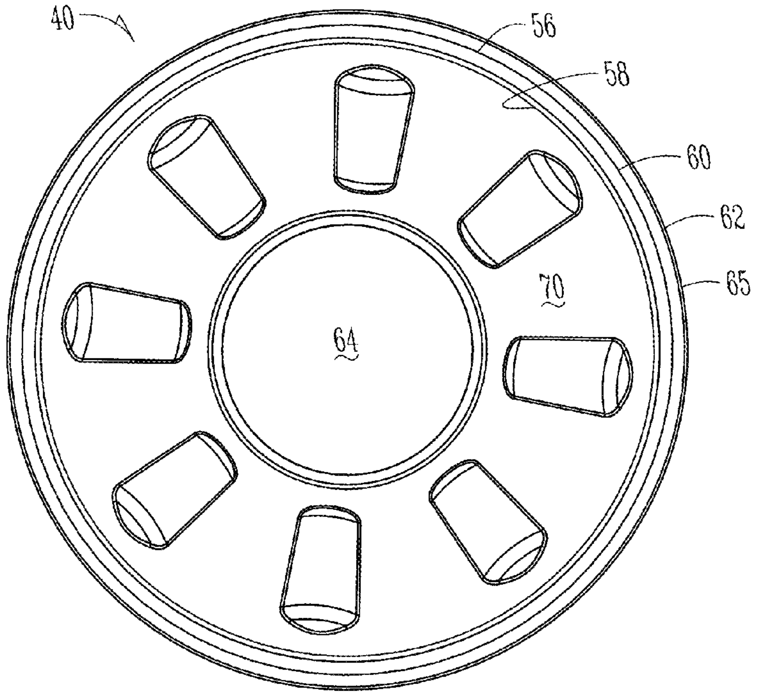
FIG. 4A is a top plan view of a lower portion of a device for packaging and dispensing a product in accordance of an illustrative embodiment.
Figure 4B:
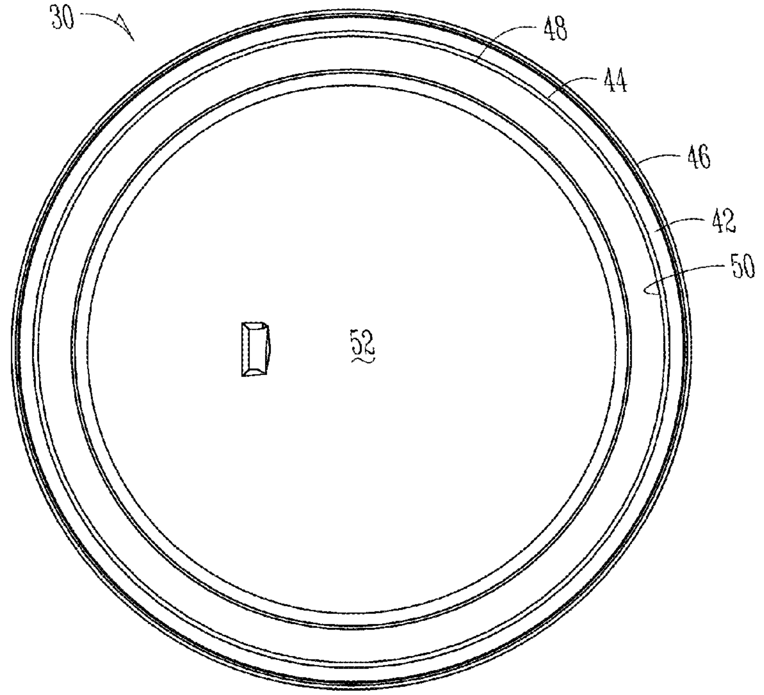
FIG. 4B is a bottom plan view of an upper portion of a device for packaging and dispensing a product in accordance of an illustrative embodiment.

Referring to FIGS. 3, 4A and 4B, a device 12 is illustrated. According to aspects of the disclosure, the device 12 may include an upper portion 30 and a lower portion 40. However, as will be understood with regard to FIG. 12, the device 12 could also comprise left and right portions 30, 40. Therefore, the portions 30, 40 may be referred to generally as a first portion 30 and a second portion 40, thereby including any of the embodiments, as well as variations thereof, as is included herein. The portions 30, 40 of the device 12 can include protrusions and/or other strengthening portions to increase the rigidity of the device 12. According to some aspects of the disclosure, the device may be blow molded or injection molded. In such a situation, the device 12 can comprise a high-density polyethylene (HDPE), although any other material capable of meeting the requirements of the device 12 can be utilized. For example, Alathon L5840, from Equistar Chemicals, LP, 1221 McKinney, Suite 700, P.O. Box 2583, Houston, Tex. 77252-2583 is one suitable material. However, it should be appreciated that other material numbers and/or manufacturers can meet the requirements of the material.

The upper portion 30 includes a sidewall 42 with a thickness defined between an inner perimeter 44 and an outer perimeter 46. The upper portion 30 may further include an inward flange 48 having an inner perimeter 50 less than the inner perimeter 44 of the sidewall 42. The inward flange 48 is contoured to the sidewall 42 of the upper portion 30. In the illustrated embodiment, the sidewall 42 and the inward flange 48 may be cylindrical, but the present disclosure contemplates any suitable shape without deviating from the objects of the present disclosure. In other embodiments, the sidewall 42 and the inward flange 48 may be square, rectangular, oval, ellipsoid, and the like. A top surface 52 is associated with the sidewall 42. The top surface 52 may be integrally formed to the sidewall 42 during fabrication or connected after the same. A handle 54 may be associated with the top surface 52. The handle 54 may comprise a portion of the top surface 52 extending through a cavity, as shown illustratively in FIG. 3, or a raised member (not shown) adapted to be handled by a user.

The lower portion 40 may also include a sidewall 56 with a thickness defined between an inner perimeter 58 and an outer perimeter 60. The lower portion 40 may further include an outwardly spaced flange 62 having an outer perimeter 65 greater than the outer perimeter 60 of the sidewall 56. The outward flange 62 is contoured to the sidewall 56 of the lower portion 40. The outward flange 62 is adapted to slidably engage the inward flange 48 of the upper portion 30. In the illustrated embodiment, the outward flange 62 may be cylindrical, but the present disclosure contemplates any suitable shape without deviating from the objects of the present disclosure. In other embodiments, the sidewall 56 and the outward flange 62 may be square, rectangular, oval, ellipsoid, and the like. The lower portion 40 may have a cylindrical portion 66 and a conical portion 68, as shown illustratively in FIG. 3, or may alternatively be a frustum of a cone. The sloped surface 70 of the conical portion 68 is designed to guide the chemical solution to a lower opening 64 at the base of the lower portion 40. Extending outwardly from the lower opening 64 may be a tubular portion 72 having a terminal opening 74. The tubular portion 72 may be adapted to receive a fitment (not shown) or a film 78 with adhesive 80 and/or a cap 82, as shown illustratively in FIG. 5.

A screen 34 is shown to be positioned generally within the device 12, as has been disclosed. The screen 34 is an optional attachment to support a solid product, and can be retained by small tabs, when used.

The fitment may be adapted to interface with the spray nozzle 32 of the cleaning system 10. The fitment may alternatively be adapted to interface with other industrial cleaning systems. The fitment may comprise a center opening and venting means. A flange of the fitment may create an interference fit with the tubular portion 72.

Figure 5:
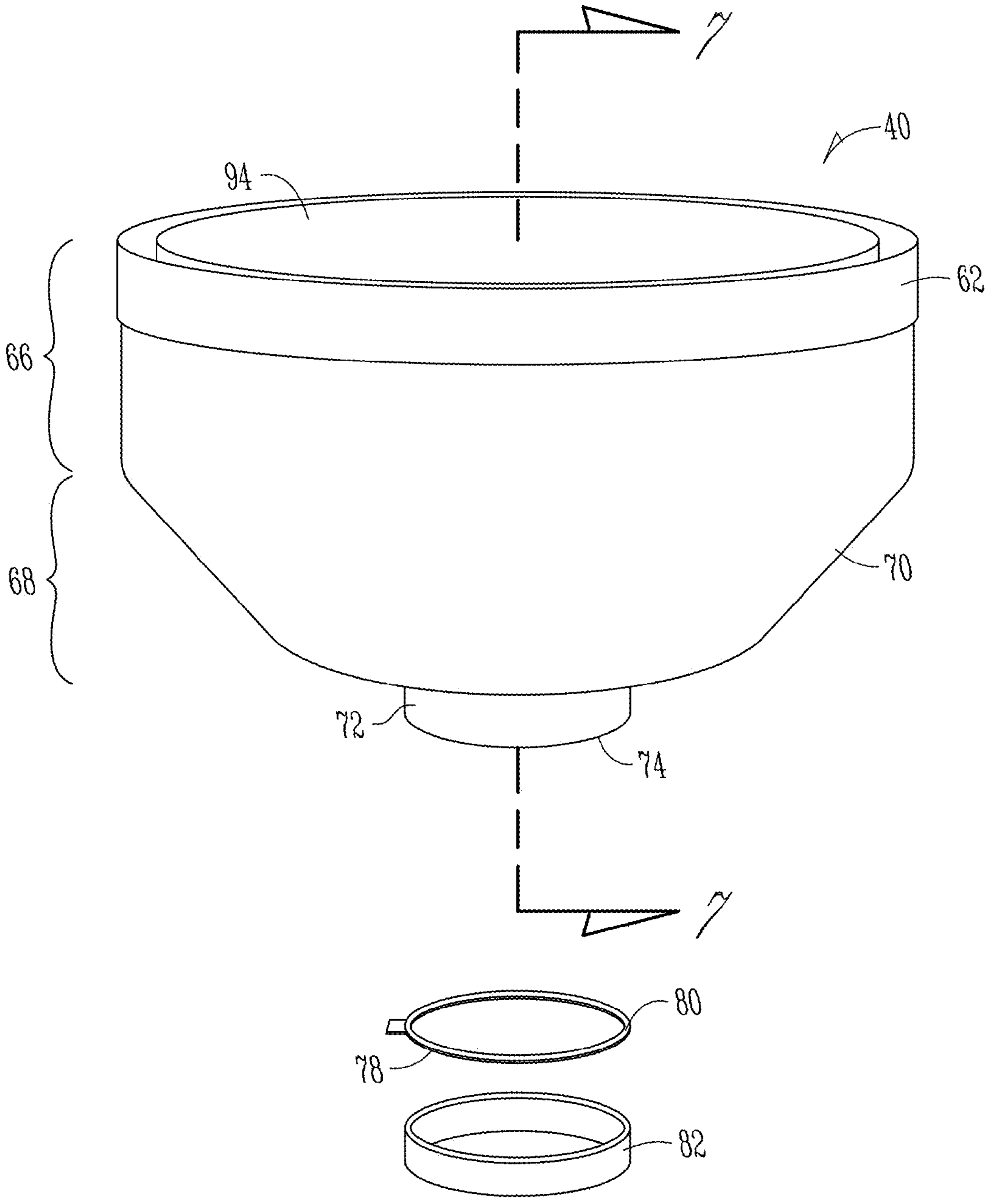
FIG. 5 is an exploded view of a lower portion of a device for packaging and dispensing a product in accordance of an illustrative embodiment.

Referring to FIG. 5, the film 78 may be contoured to the terminal opening 74 of the tubular portion 72. The adhesive 80 temporarily secures the film 78 to the tubular portion 72, but is designed to be removable by a user. According to some aspects, the film 80 is adapted to be punctured by a puncturing means when installed in the system 10. The cap 82 may be installed in addition to, or in lieu of, the fitment or the film 78. The cap may be threadably engaged to the tubular portion 72, or connected by other means commonly known in the art.

The upper portion 30 and/or the lower portion 40 may be composed of rigid or semi-rigid material resistant to the chemicals typically used in the system 10, and more particularly, the solid chemical product. For example, the device 12 may be constructed of plastics such as polyolefins (e.g., high density polyethylene (HDPE), low density polyethylene (LDPE), polypropylene (PP)), polyvinyl chlorides (PVC), and fluropolymers (e.g., polyethylene terephthalate (PETE), fluorinated ethylene propylene (FEP), PerFluoroAlkoxy (PFA), polyvinylidene fluoride (PVDF), ethylene tetrafluoroethylene (ETFE), etc.). It is contemplated that still other materials meeting the requirements of being used with various chemicals can be comprise the portions 30, 40 of the disclosure, and the disclosure need not be limited to those disclosed. Furthermore and as previously disclosed, the device 12 can be formed of blow molding, injection molding, or generally any other method utilizing the materials disclosed.

To secure the upper portion 30 and the lower portion 40, the inward flange 48 of the upper portion 30 is sized and/or shaped to slidably engage the outward flange 62 of the lower portion 40. In an exemplary embodiment, the inward flange 48 and the outward flange 62 are friction fit. The upper portion 30 may include one or more locking protrusions 92. The locking protrusions 92 may extend outwardly from the sidewall 42 of the upper portion 30 proximate the inward flange 48. One more locking tabs 90 may extend upwardly from the outward flange 62 of the lower portion 40. The locking tabs 90 are configured to securely engage the locking protrusions 92. According to additional aspects of the disclosure, the locking protrusions 92 extend outwardly from the lower portion 40. In still yet another embodiment, the connection means may be counterpoising cylindrical snap-locks 93, as shown illustratively in FIG. 10. The connection means may be snap-fit mechanisms or any other connection means commonly known in the art. For example, the connection means may be detent pins configured to engage cavities, pins, clamps, and the like. Further, the present disclosure contemplates that the connections means may be temporary or permanent (i.e., once secured, the connection means are unable to be unsecured, making the device 12 single-use only). Still further, it is contemplated that the inward flange include external threading members, while the outward flange 62 include inward threading members such that the portions are threadably attached to one another.

Figure 6:
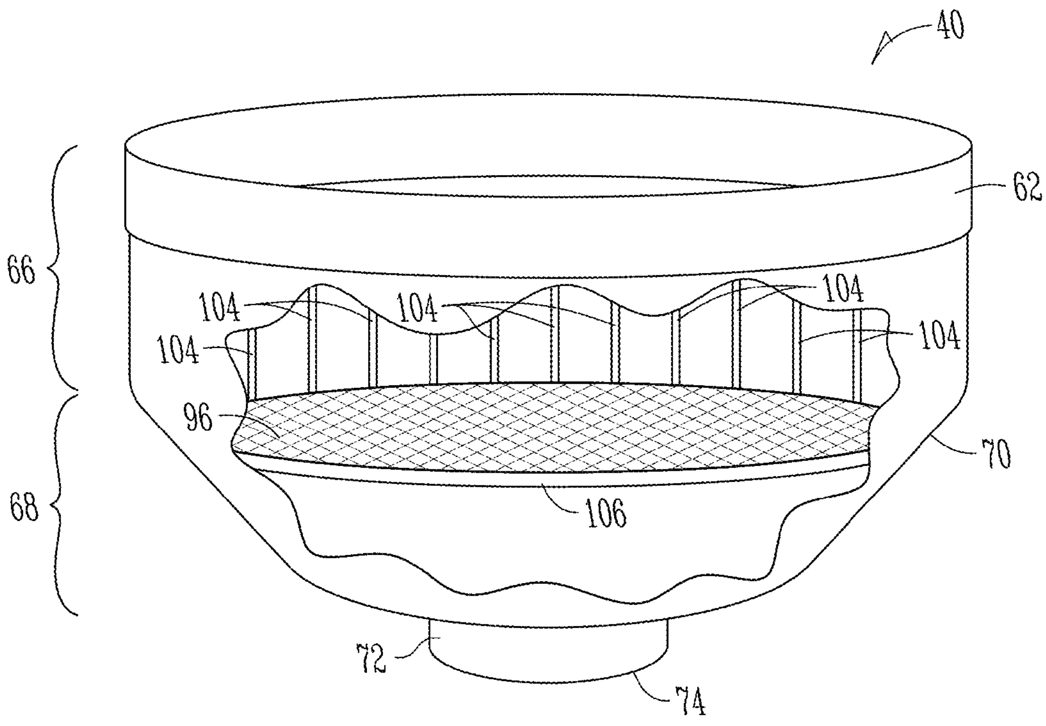
FIG. 6 is a front partial section view of a lower portion of a device for packaging and dispensing a product in accordance of an illustrative embodiment.
Figure 7:
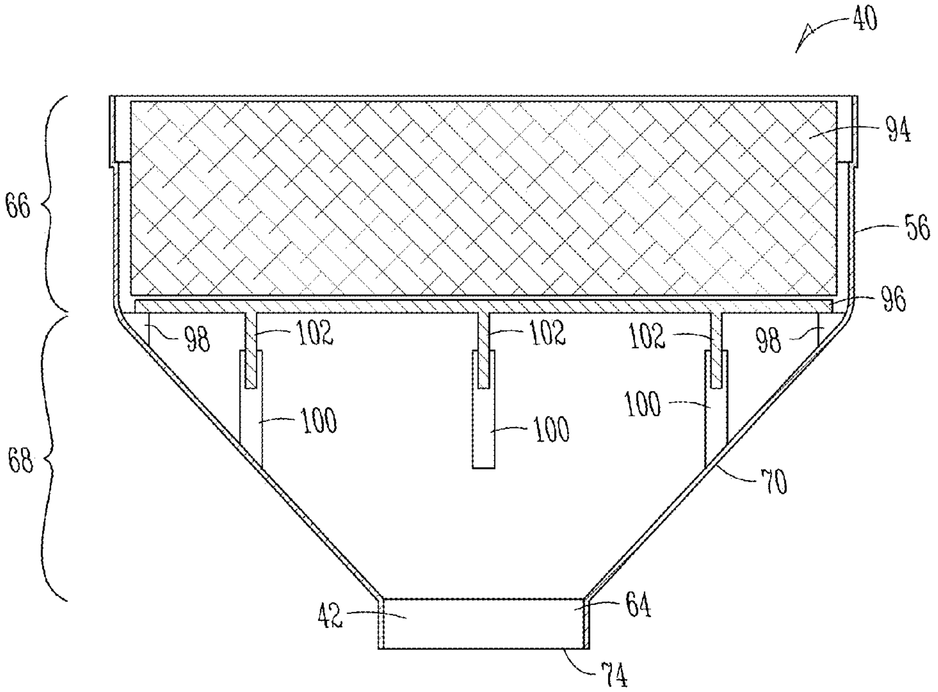
FIG. 7 is a cross sectional view of the lower portion of FIG. 5 taken along section line 7-7.

Referring to FIGS. 5-7, a solid chemical product 94 is disposed within lower portion 40 of the device 12. Based on the dimensions of the product 94 and/or the design of the device 12, the product 94 may be disposed within the upper portion 66, or with portions extending into both the upper portion 66 and the lower portion 68. Similarly, the product 94 often will extend at least partially into the upper portion 30 of the device 12.

To maintain the appropriate, predetermined, and/or preferred distance of the chemical product 94 from the spray nozzle 32, a screen 96 can be disposed within the lower portion 40 of the device, as shown illustratively in FIGS. 6 and 7. The perimeter of the screen 96 may be contoured to the lower portion 40. In the illustrated embodiment, the screen 96 is cylindrical, but this is not to be limiting, as the screen is able to take generally any geometric shape necessary. The screen may be composed of the corrosion-resistant chemicals previously expressed herein. In an exemplary embodiment, the screen 96 is secured within the lower portion 40 through an interference fit with the sloped surface 70. In another exemplary embodiment, the screen 96 may rest on a lip 98 extending around the perimeter of the sloped surface 70. The lip 98 may alternatively be associated with the sidewall 56 of the lower portion 40. In yet another exemplary embodiment, a plurality of post receivers 100 may extend upwardly from the sloped surface 70. A plurality of associated posts 102 may be associated with the screen 96. When installed, the posts 102 are inserted into the post receivers 100 to secure the screen 96 to prevent axial movement and rotation of the screen 96 within the lower portion 40. The posts 102 may be integrally formed with a frame 106 of the screen 96 or connected to the frame 106. In still yet another embodiment, a plurality of crush ribs 104, as shown illustratively in FIG. 6, may be associated with the lower portion 40 of the device. The crush ribs 104 may be vertically oriented and extend inwardly from the sloped surface 70 and/or the inner perimeter 58 or the sidewall 56 of the lower portion 40. Based on the relative tolerances of the frame 106 of the screen 96 and the crush ribs 104, the screen 96 is held securely in place through friction fit. The crush ribs 104 may be of constant depth, or may be tapered with greater depth proximate to the lower opening 64 to create a friction fit at a desired elevation above the lower opening 64. The screen 96 may be connected through any other and/or additional means commonly known in the art, including pinning, clamping, detent structure, and the like. The advantageous design of the device 12 provides for ease of installation, replacement and/or uninstallation of the screen 96 within the device 12.

Figure 8:
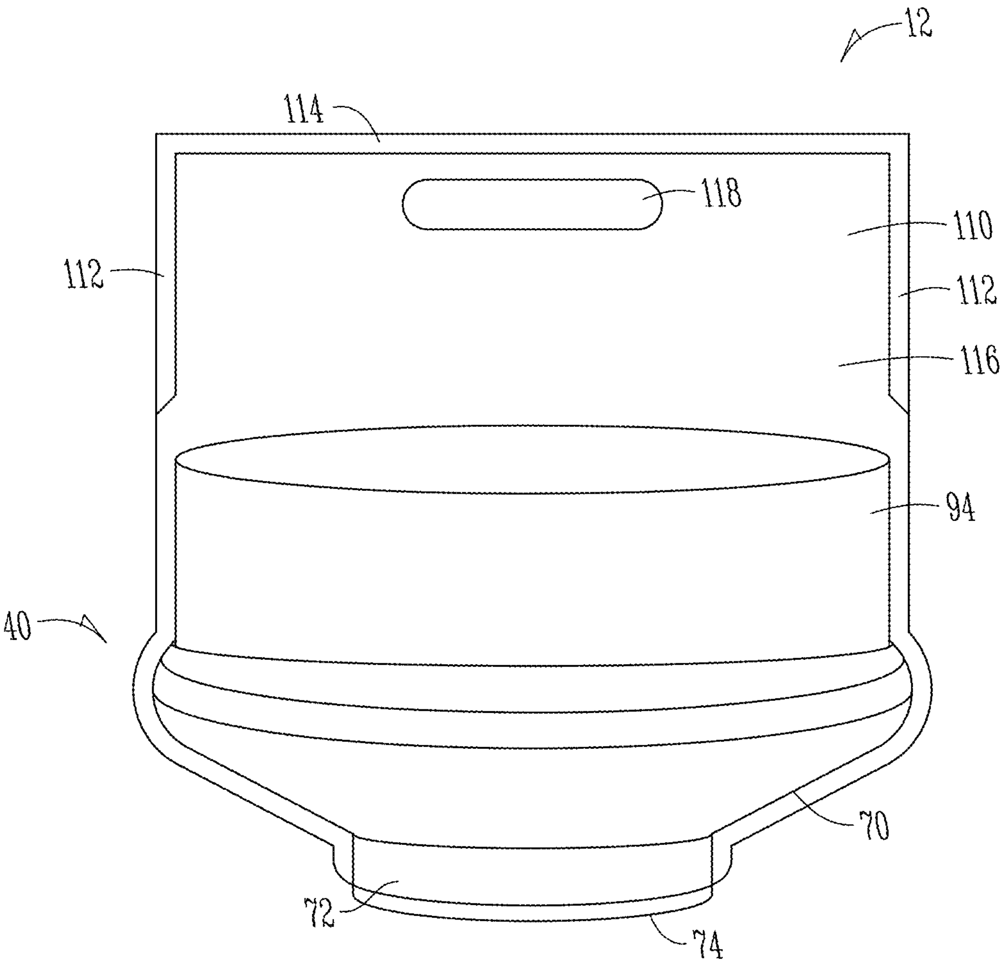
FIG. 8 is a front perspective view of a device for packaging and dispensing a product in accordance of an illustrative embodiment.
Figure 9:
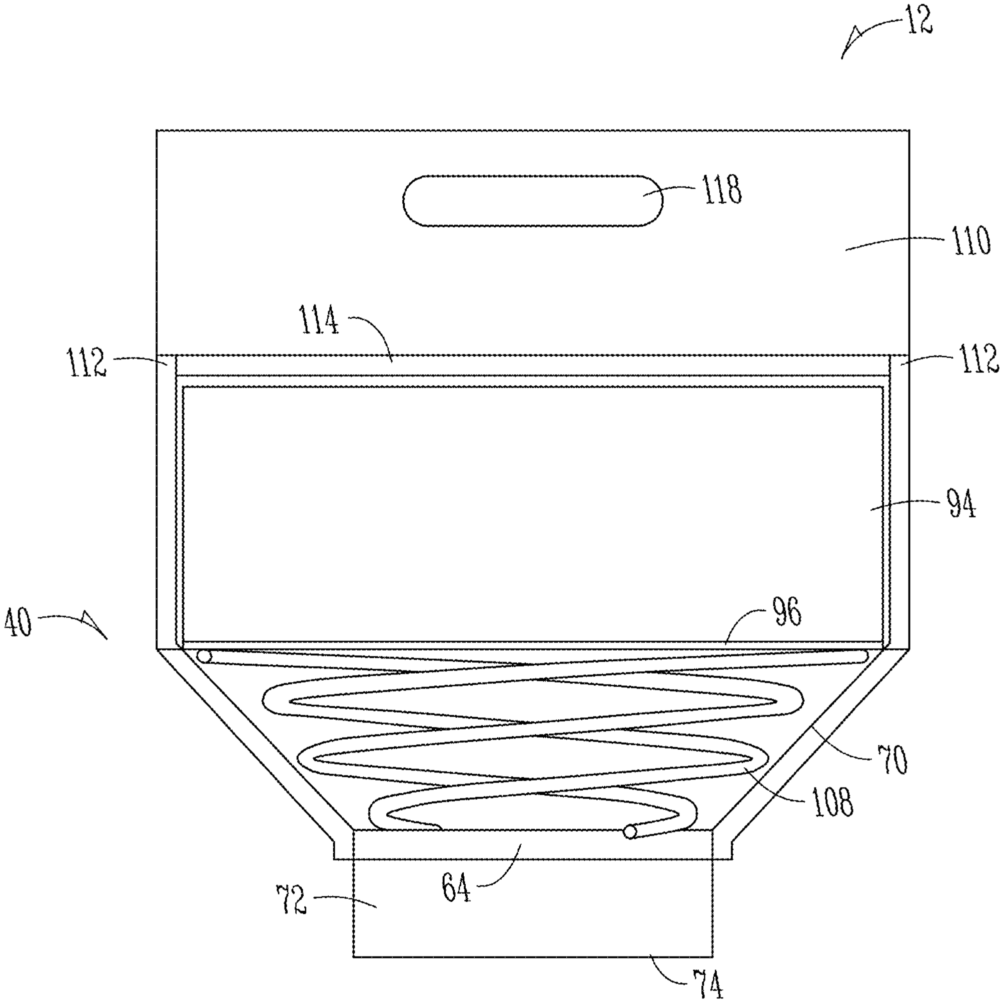
FIG. 9 is a front perspective view of a device for packaging and dispensing a product in accordance of an illustrative embodiment.

FIGS. 8 and 9 illustrate a device 12 in accordance with another exemplary embodiment of the present disclosure. The device 12 may include a lower portion 40 similar to that previously shown and described. In particular, the lower portion 40 may have an inner perimeter of suitable size and shape to contain at least a portion of the outer perimeter of the chemical product 94. Further, the lower portion 40 may include the sloped surface 70, the tubular member 72, and the terminal opening 74. When installed within a container 14, the sloped surface 70 is designed to create an interference fit with the lower portion 18 of the container 14. The lower portion 40 of the device 12 may be comprised of rigid or semi-rigid material and/or the corrosion-resistant materials previously expressed herein. A screen 96 is disposed within the lower portion 40 of the device 12 of the exemplary embodiment illustrated in FIG. 8 consistent with the present disclosure previously expressed herein.

In alternate embodiments, a semi-rigid or rigid helical wire 108 may provide structural support to the lower portion 40 of the device 12, as shown illustratively in FIG. 9. The helical wire 108 may be associated with a semi-rigid lower portion 40, or be installed within a flexible enclosure 110 to provide for a sloped surface 70 and an lower opening 64 similar to the embodiments previously expressed herein. In an embodiment, the helical wire 108 is connected to the tubular portion 72, after which the flexible enclosure 110 encloses the lower portion 40. A screen 96 may be interfaced with the helical wire 108 to ensure proper distance between the spray nozzle 32 and the chemical product 94.

Referring to FIGS. 8 and 9, the flexible enclosure 110 may be contoured to a portion of the tubular member 72, the lower portion 40 of the device 12, and/or the chemical product 94. In an exemplary embodiment, the flexible enclosure 110 is a polymer film that shrinks under the influence of heat, including but not limited to polyolefin, PVC, polyethylene, polypropylene, and the like. The heat-shrink film provides a barrier between the chemical product 94 and a user that is inexpensive and easy to manufacture. The heat-shrink film may be transparent, advantageously permitting a user to see the remaining quantity of the chemical product 94 during operation. The film may alternatively be translucent or opaque, and/or contain information such as installation instructions and/or warnings.

The flexible enclosure 110 may include one or more side seams 112 and/or an upper seam 114. In the embodiment, the flexible enclosure 110 results in a hollow portion 116 above the chemical product 94. A handle 118 may be associated with the flexible enclosure 110 proximate to the upper seam 114. In an alternate embodiment, the flexible enclosure 110 is further contoured to an upper surface of the chemical product 94, as shown illustratively in FIG. 9. A handle 118 may be connected to the device 12. In yet another embodiment, the flexible enclosure 110 encloses the tubular portion 72, including the terminal opening 74. In such an embodiment, the portion of the flexible enclosure 110 disposed over the terminal opening 74 is removed prior to installation or punctured during installation.

The figures thereby disclose additional ways that the device can be manufactured. For example, a device 12 as shown in FIG. 8, 9, 12, 13, 14A, 14B, or 15 could be formed utilizing thermoforming. The device 12 can comprise two identical or asymmetrical halves (which can be referred to as first and second portions 30, 40) split longitudinally or latitudinally. These portions could then be sealed about their perimeter, such as at a flange portion to combine. The sealing could be done via heating, ultrasonic welding, or generally any other method to combine the components/housings of the device 12 to be combined. The individual components, such as those shown in FIGS. 3, 4A, and 4B, could be formed such as by blow molding or injection molding. The components could then be attached to one another by heat staking or welding (such as ultrasonic welding) to adhere the components to one another. As mentioned, this could be done when the components of the housing are as shown in FIG. 3 with them being split latitudinally, or when the components are split longitudinally.

Figure 15:
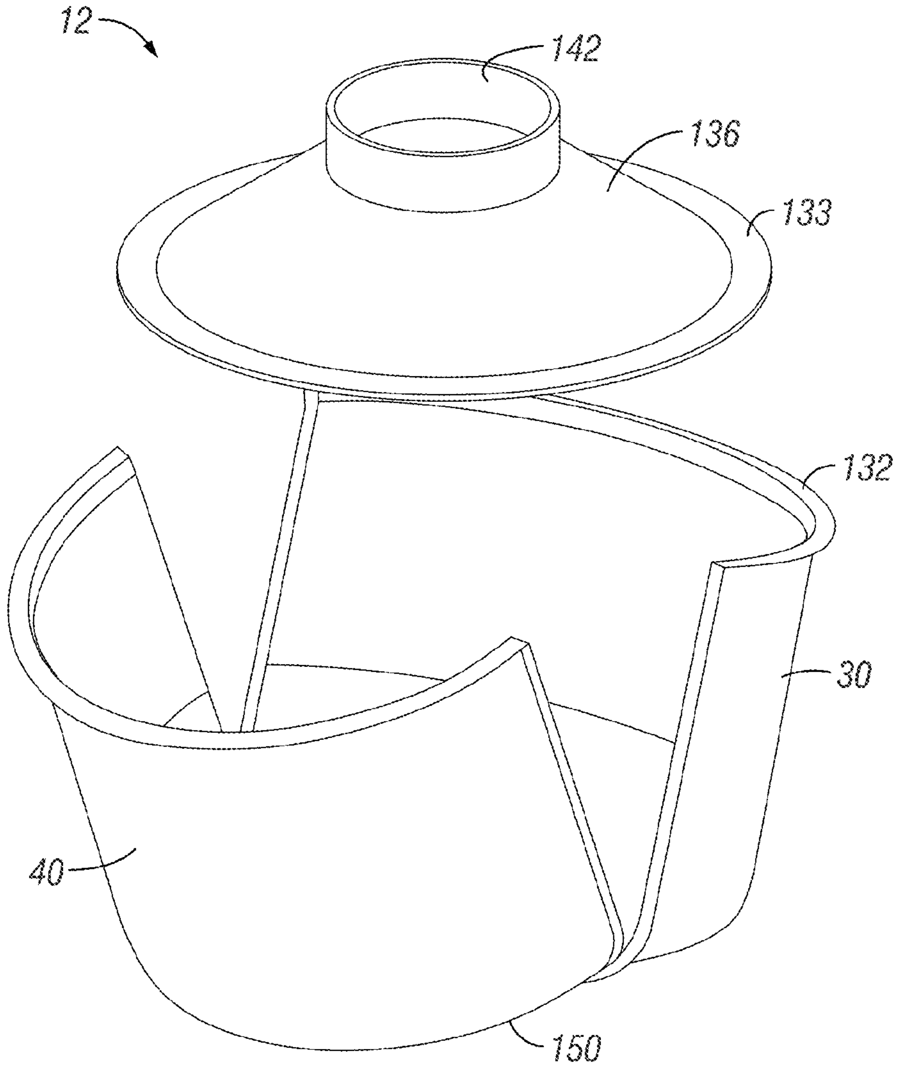
FIG. 15 is a view of another variation of a device for packaging and dispensing a product in accordance of an illustrative embodiment.
Figure 16:
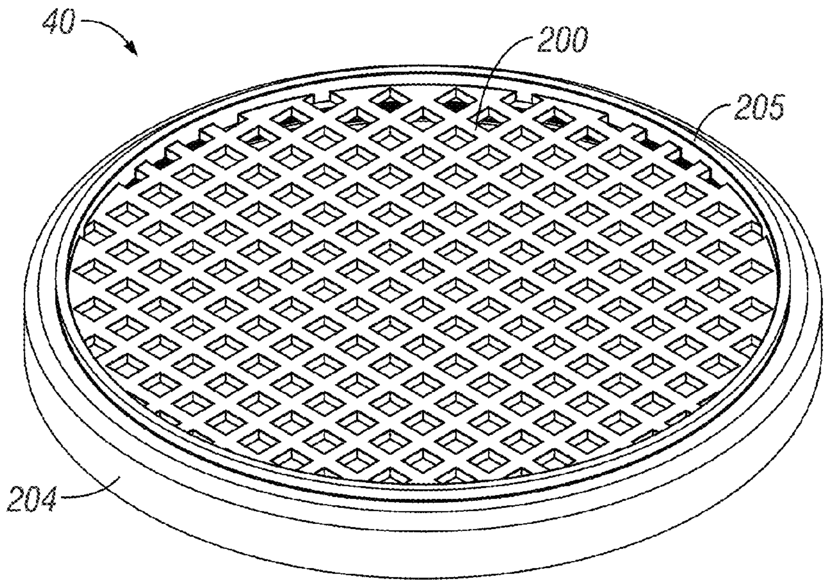
FIG. 16 is a perspective view of an integrated lower member and screen according to aspects of the disclosure.
Figure 17:
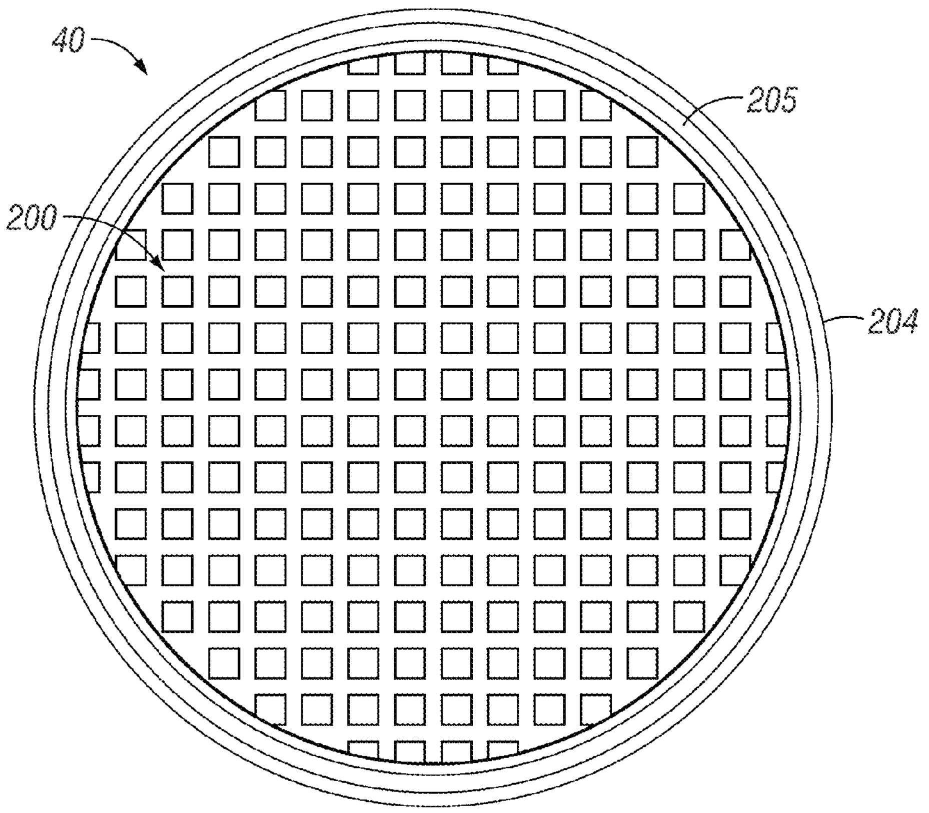
FIG. 17 is a top plan view of the lower member and screen of FIG. 16.
Figure 18:
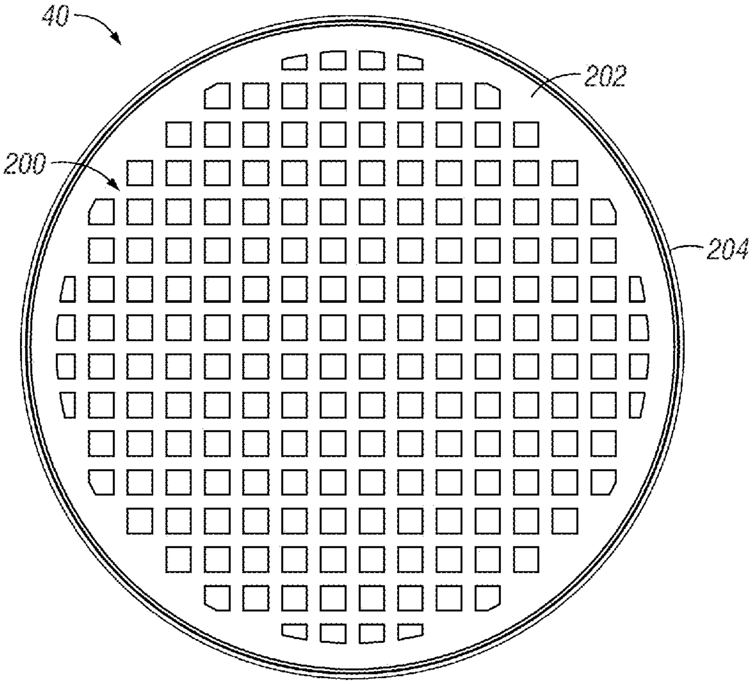
FIG. 18 is a bottom plan view of the lower member and screen.
Figure 19:
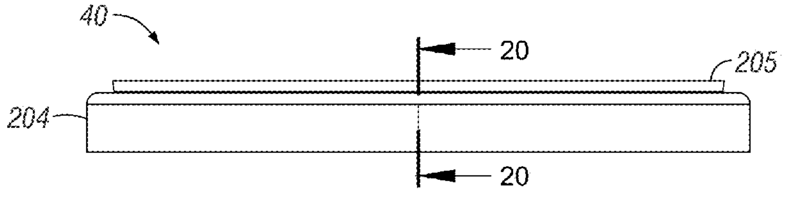
FIG. 19 is a side elevation view of the lower member and screen.
Figure 20:
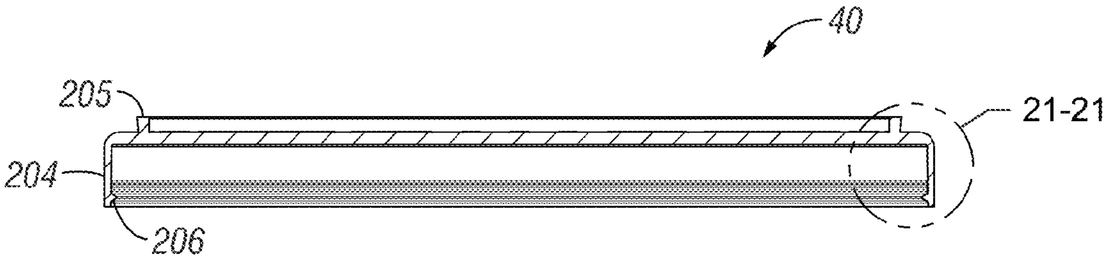
FIG. 20 is a sectional view of the lower member and screen.

When the components are split longitudinally, the may have a common connection point, such as a living hinge 150. This is shown by the device 12 in FIG. 15. The components 30, 40 would then be mirror images of one another extending from said hinge. This would form a type of clam shell configuration for the device housing. The components could be folded about the hinge and combined about their now common perimeter, such as by welding (ultrasonic or otherwise), melting (heat sealing), or any other manner in which the portions would become at least partially or substantially attached to one another. Furthermore, as shown in FIG. 15, the halves 30, 40 may only form the conical section 134, and the sloped portion 136 may be formed separately with its own flange 133. In such a situation, the flange 133 of the sloped portion 136 could then be sealed to the flange 132 of the first and second portions 30, 40. This could create any of the various configurations of the housings of the device 12.

Figure 12:
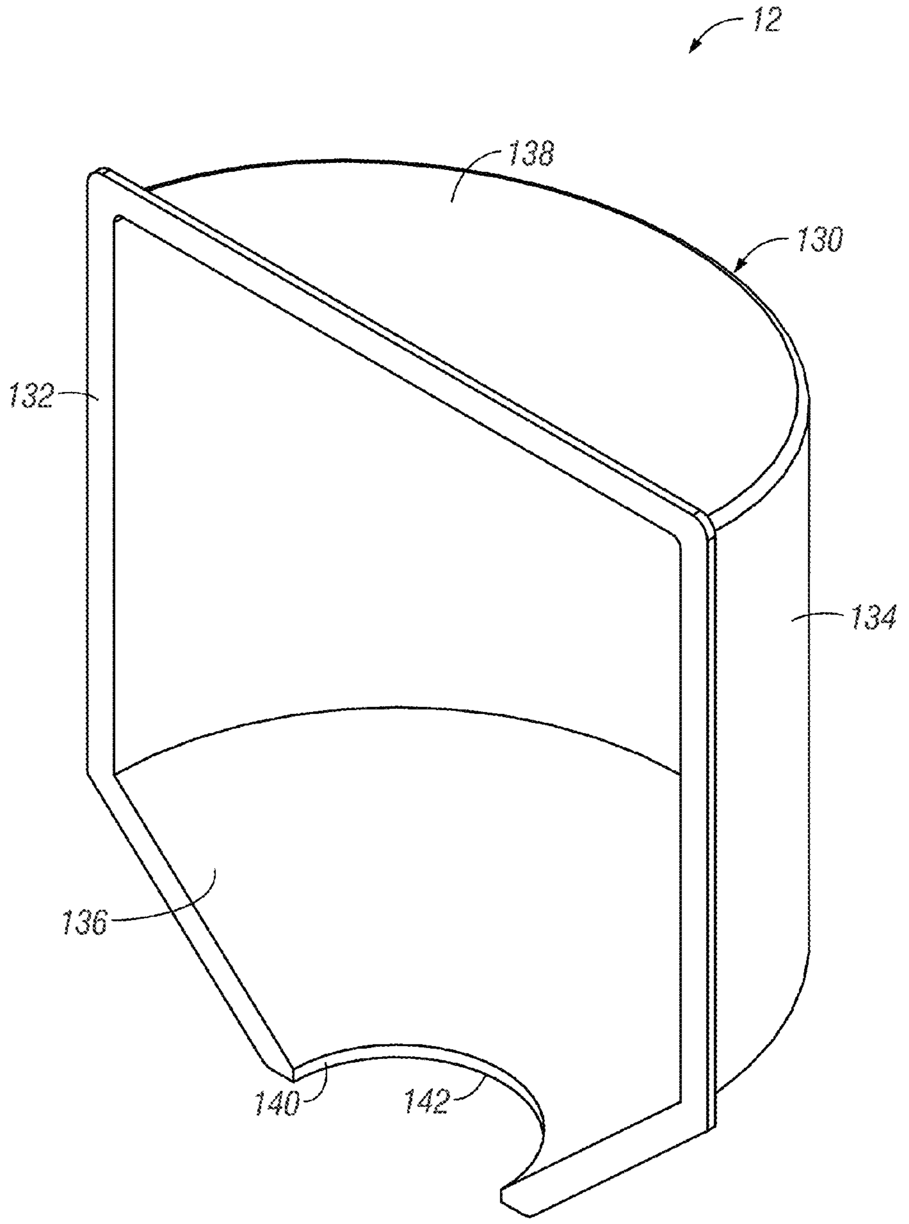
FIG. 12 is a perspective view of a portion of a device for packaging and dispensing a product in accordance of an illustrative embodiment.
Figure 13:
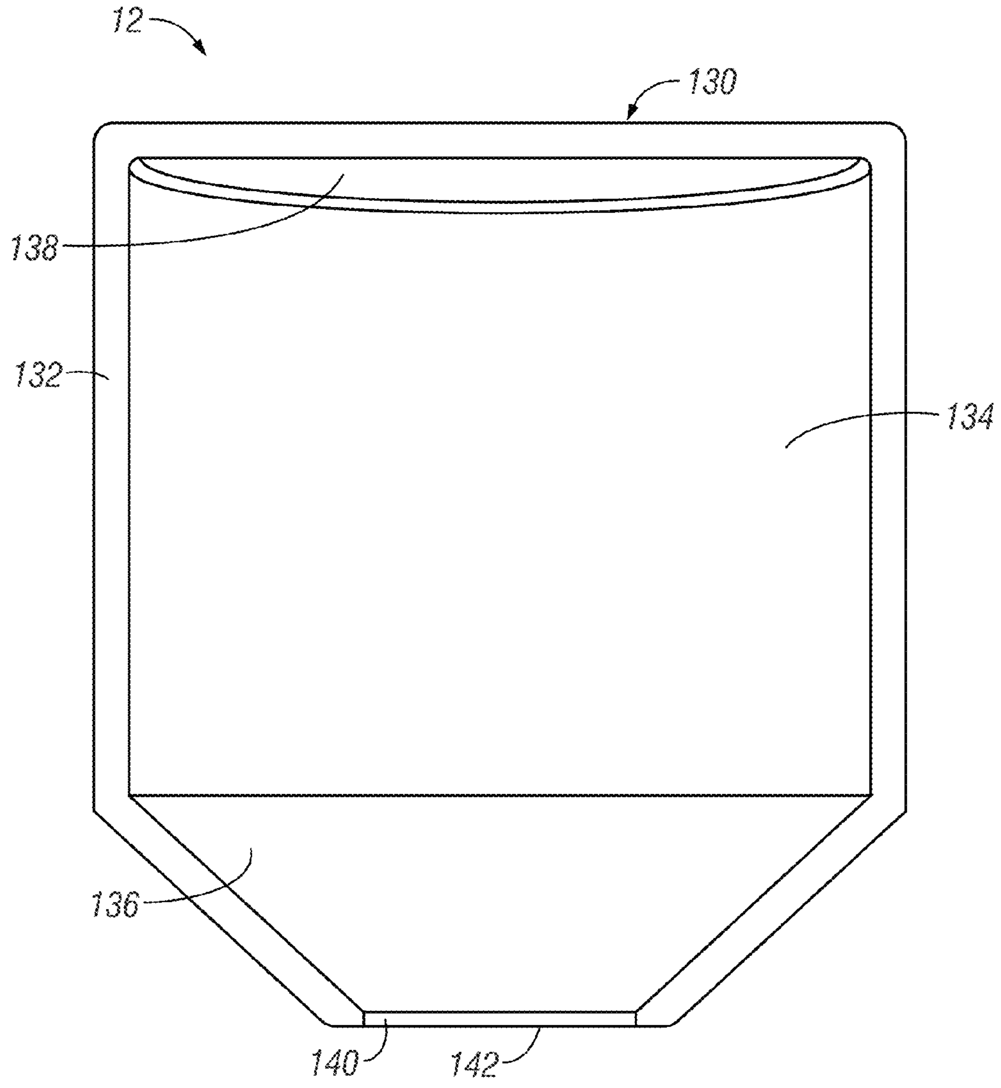
FIG. 13 is a front plan view of a portion of a device for packaging and dispensing a product in accordance of an illustrative embodiment.

For example, a half of a device 12 that could be sealed about its perimeter 132 is shown in FIGS. 12 and 13. The half of the device shown in the Figs. could be either a first portion 30 or a second portion 40. As shown, the device 12 is split longitudinally with generally left and right portions, but the same could be done latitudinally, wherein the flange or perimeter 132 could be positioned at the connection of the upper and lower portions of the halves. It is further noted that the portions as shown in FIGS. 12 and 13 may be identical or symmetrical, or they could be asymmetrical, with one of the first or second portions including additional elements, such as hinges, handles, screens, product ledges, or the like.

Figure 14A:
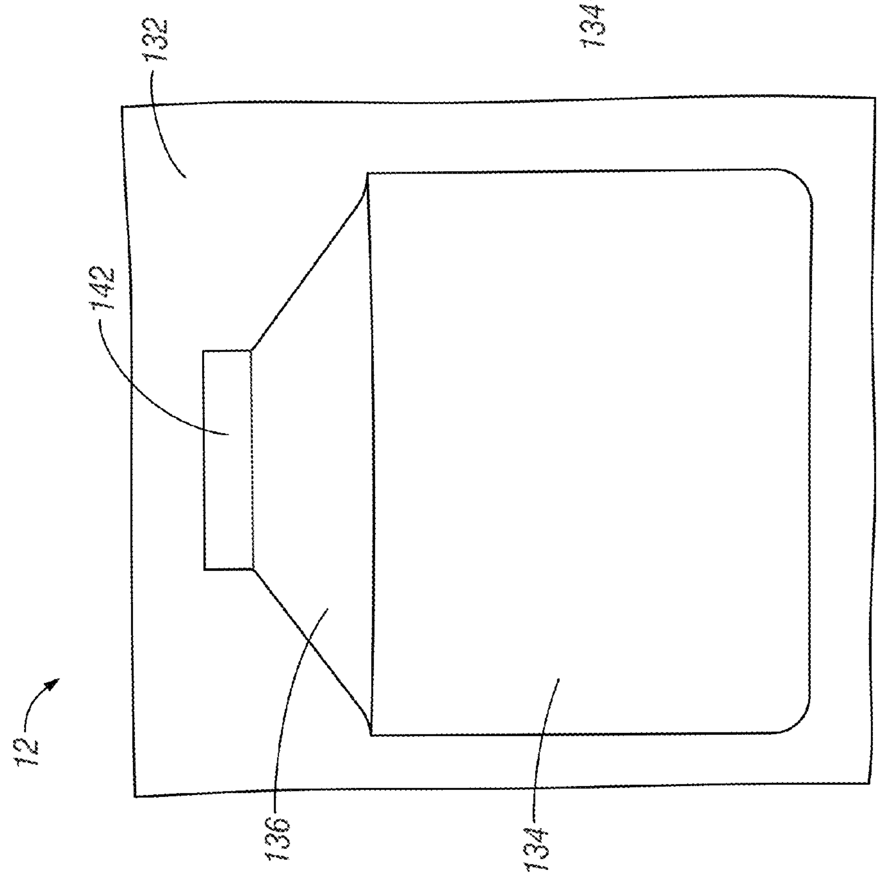
FIGS. 14A and 14B are photographs of variations of the device as shown and described with regard to FIGS. 12 and 13.
Figure 14B:
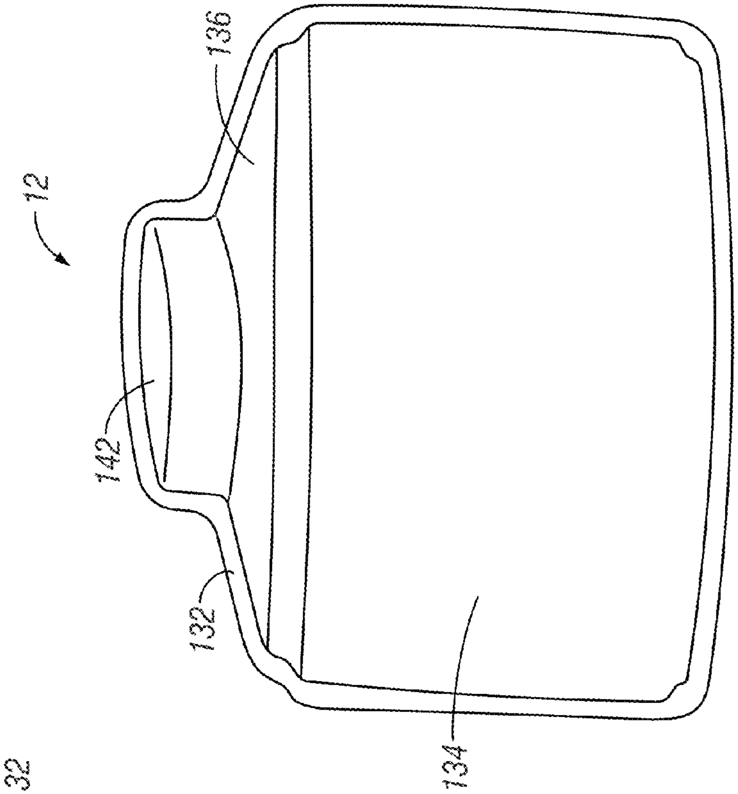

As shown in FIGS. 12, 13, 14A, and 14B, the half 130 includes a substantially vertical or conical portion 134 and a sloped portion 136 extending from one end. The opposite end includes a cap portion 138. At the end of the sloped portion is an opening 140, which, when combined with the other half, would form the terminal opening 142 of the device 12. Also included is the flange 132 around the perimeter of the half, with an exception at the terminal opening or dispensing aperture 142. However, as is shown by the embodiments of FIGS. 14A and 14B, the aperture 142 could also be sealed shut, and opened upon use of the device and product in the container.

To form packaging with the product stored within, the product is positioned within one of the halves (for example, one of the portions 30, 40) and the other half is brought in contact such that the flanged perimeter 132 is in contact or otherwise close proximity with the other flange. For example, one half could be positioned on its side and the product and a screen or other support member could be positioned in the half. The other half could then be positioned adjacent the first portion. The flanges are then connected, such as by welding (heat or ultrasonic), heat staking, or otherwise sealing the halves to one another. The device can then be used with a container as is known, such as by providing erosion means to the product to produce a chemistry for use in an end product.

Figure 10:
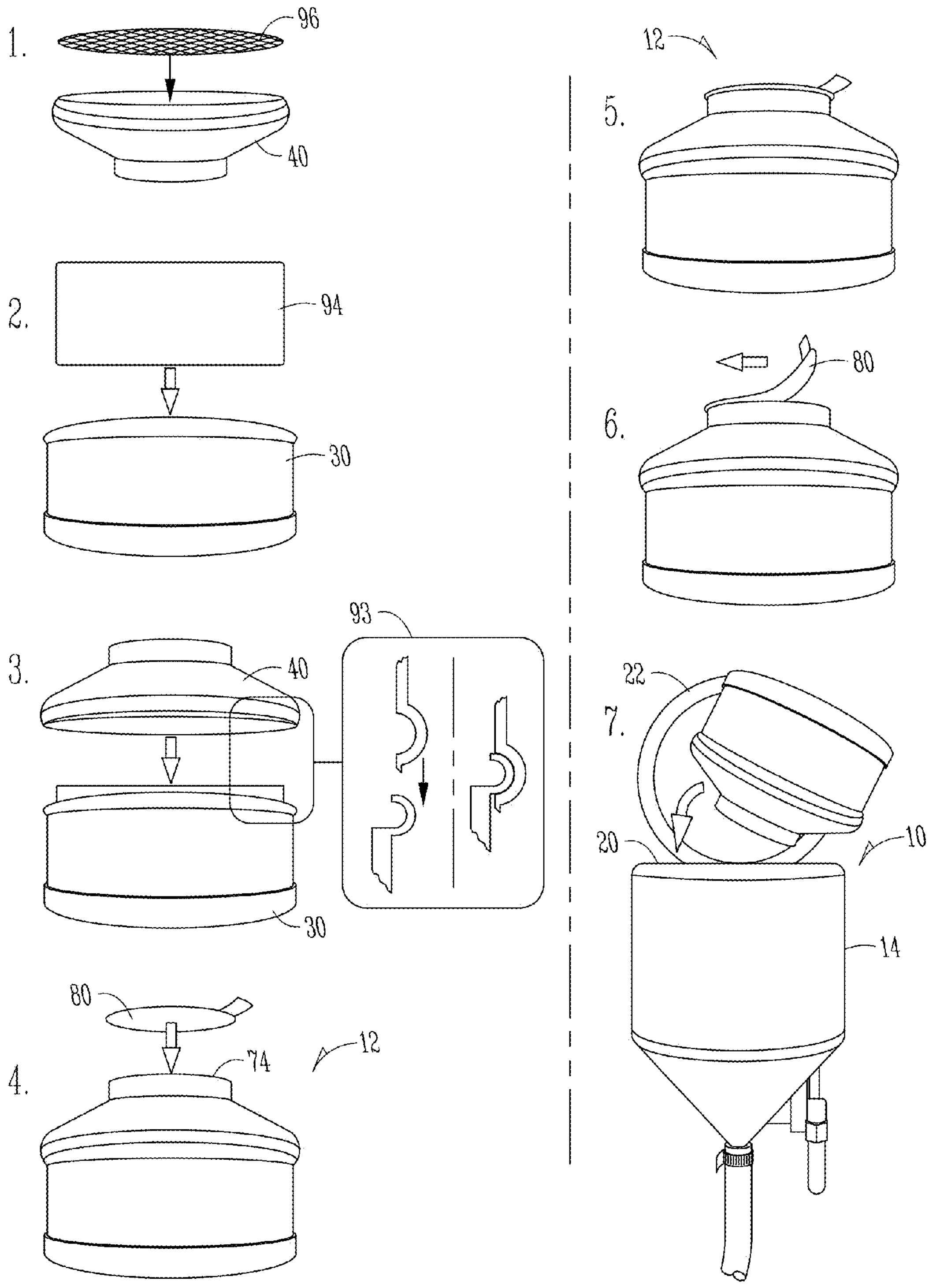
FIG. 10 is a flowchart of assembling a device for packaging and dispensing a product in accordance of an illustrative embodiment.

A method for assembling a device 12 in accordance with an exemplary embodiment of the present disclosure is illustrated in FIG. 10. A screen 96 is installed into the lower portion 40 of the device 12 consistent with any of the means previously disclosed herein (e.g., interference fit, lip 98, posts 100 and 102, and/or crush ribs 104). A chemical product 94 is inserted into the upper portion 30 of the device 12. The upper portion 30 and the lower portion 40 are joined through any of the connection means previously discussed herein (e.g., friction fit, tabs 90 and 92, and/or snap-locks 93). The process could be done in other ways, such as by placing the product in the upper portion and then positioning a screen or other support member into the upper portion before securing the portions to one another.

A film 80 (and/or a fitment and/or a cap 82) is attached to the terminal opening 74 or the device 12. When ready for installation to the system 10, the film 80 (or the cap 82) is removed, as is shown by step 6 in FIG. 10. The lid 22 on the system 10 is opened, exposing the opening 20 of the container 14. The device 12 is inverted and placed within the container 14. The chemical product 94 rests on the screen 96.

Figure 11:
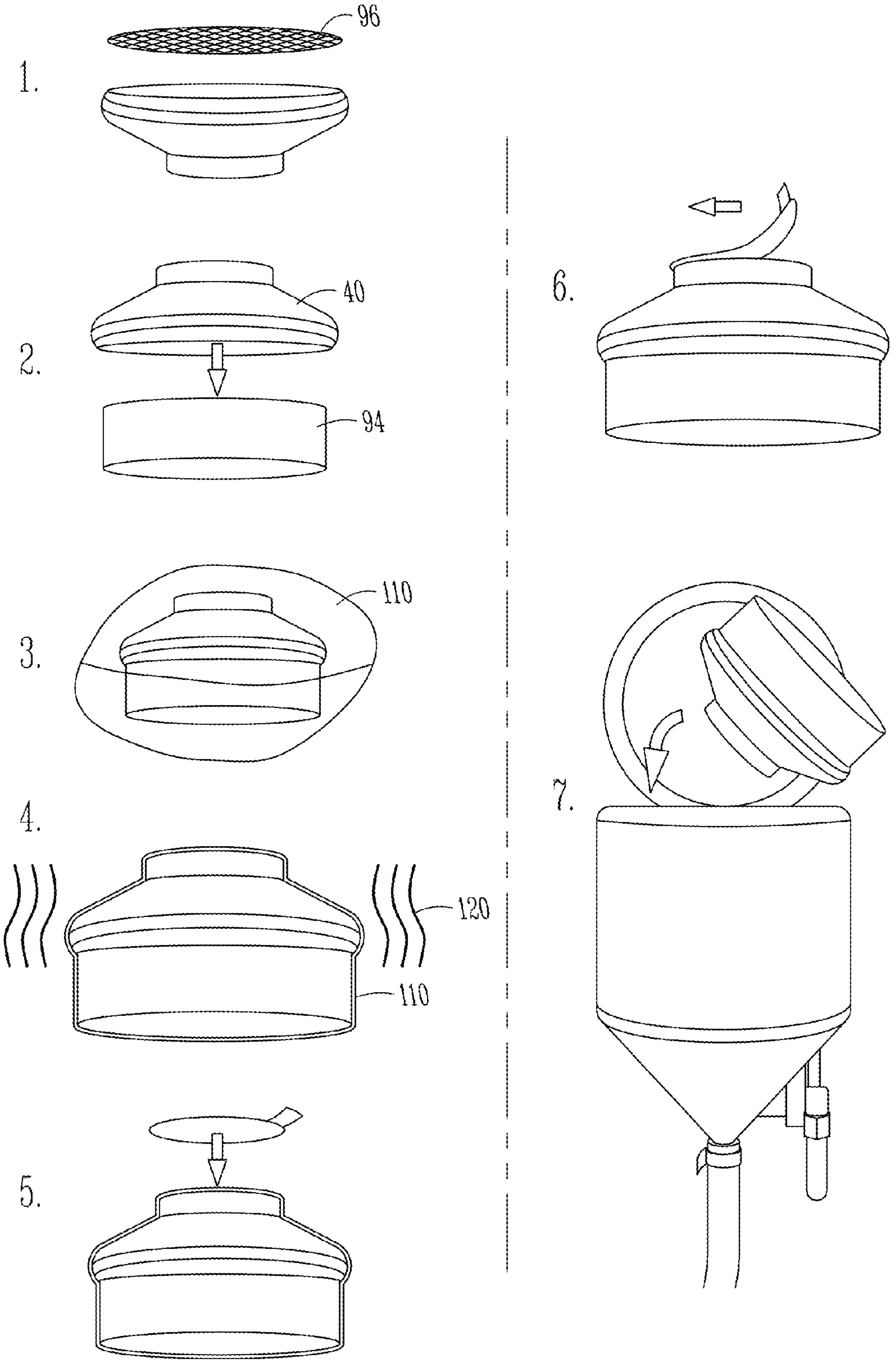
FIG. 11 is a flowchart of assembling a device for packaging and dispensing a product in accordance of an illustrative embodiment.

Another method for assembling a device 12 in accordance with an exemplary embodiment of the present disclosure is illustrated in FIG. 11. A screen 96 is installed into the lower portion 40 of the device consistent with any of the means previously discussed herein (e.g., interference fit, lip 98, posts 100 and 102, and/or crush ribs 104). A chemical product 94 is inserted into the lower portion 40 of the device 12. The lower portion 40 and chemical product 94 are encased in a flexible enclosure 110, such as heat-shrink film. Heat 120 is applied to shrink the flexible enclosure 110. If the terminal opening 74 remains exposed, a film 80 (and/or a fitment and/or a cap 82) may be attached to the device 12. When ready for installation to the system 10, the film 80 (or the cap 82) is removed. The lid 22 on the system 10 is opened, exposing the opening 20 of the container 14. The device 12 is inverted and placed within the container 14. The chemical product 94 rests on the screen 96.

In an alternative method of assembling a device 12 in accordance with an exemplary embodiment of the present disclosure, a helical wire 108 can be connected to the tubular member 72, such as is shown in FIG. 9. A screen 96 is associated with the helical wire 108. The chemical product 94 is disposed on the screen 96. The result is encased in a flexible enclosure 110, such as heat-shrink film. Heat 120 is applied to shrink the flexible enclosure 110. The flexible enclosure 110 may be adapted to contour to the sides of chemical product 94, or the sides and the upper surface of the chemical product 94, and/or the helical wire 108. A hollow portion 116 and/or seams 112 and 114 may be associated with the flexible enclosure 110. A handle 118 may be created within the flexible enclosure 110. If the terminal opening 74 remains exposed, a film 80 (and/or a fitment and/or a cap 82) may be attached to the device 12. When ready for installation to the system 10, the film 80 (or the cap 82) is removed. The lid 22 on the system 10 is opened, exposing the opening 20 of the container 14. The device 12 is inverted and placed within the container 14. The chemical product 94 rests on the screen 96.

Returning to FIGS. 1 and 2, the device 12 is installed within the container 14 of the system 10. In operation, water is fed through the water line 36 and the inlet pipe 30 to the spray nozzle 32. The spray nozzle 32, disposed proximate to or within the tubular member 72 of the device 12, sprays an angled jet 122 into the lower portion 40 of the device 12. The angled jet 122 contacts the lower surface of the chemical product 94 through the screen 96, which dissolves a portion of the chemical product 94. The resulting solution 124 descends along the sloped surface 70 of the lower portion 40 and/or through the lower opening 64 and the terminal opening 74, and to the lower portion 18 of the container 14. The solution 124 descends through the outlet screen 34 into the discharge tube 36, after which it is metered to the dishwashing, ware washing, or other industrial cleaning process.

The design advantageously eliminates or at least mitigates potential exposure of a user to the chemical product 94 during installation and/or removal of the device 12. After removal of the film 80 or the cap 82, the chemical product 94 remains at a safe distance from the terminal opening 74 of the device 12. During removal, the device 12 is removed as a whole, including the screen 96 and any unused contents of the chemical product 94, after which a new device 12 is then quickly and efficiently replaced into the system 12. A new screen 96 associated with each device further prevents agglomerations of the chemical product 94 on the screen, maintaining consistent water application of the spray nozzle 32 and resulting mixture of the solution 34.

It should be noted, while the disclosure has been disclosed to be used with a spray mechanism to dissolve a solid product, other methods are contemplated. For example, it is known to dissolve solid products in dispensers such as ones that can incorporate the disclosure by use of spraying, flooding, bubbling, submersion, or some combination thereof. The disclosure contemplates that any possible means and methods for dissolving and/or eroding a solid product can be utilized with any of the embodiments and/or aspects of the disclosure, without changing the scope or intended spirit of the disclosure.

For example, U.S. patent application Ser. No. 13/771,351 (now U.S. Pat. No. 8,945,476); Ser. Nos. 14/182,344; 14/182,346; and 14/182,353 all disclose various dispensers including methods and means for dissolving and/or eroding a solid product. The contents of each of the listed applications are hereby incorporated by reference in their entirety.

Figure 21:
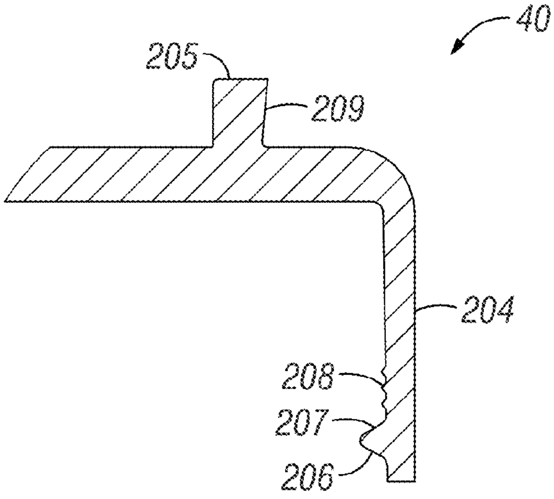
FIG. 21 is a view of an enlarged portion of the sectional view of FIG. 20.

FIGS. 16-21 show additional aspects of a lower member or portion 40 is not sloped in shape, but instead incorporates or is integral with a screen portion 200. The lower member 40 with screen 200 integrated therewith can be attached to an upper portion or member 30 as previously disclosed. For example, as shown best in FIGS. 20 and 21, the lower member 40 can include an interior screen surface 202 with an annular rim 204 extending therefrom. The rim 204 can extend at an outer edge of the screen 200 or can be spaced radially away therefrom before extending generally away. On the exterior face 203 of the screen 200, there can be an annular exterior rib 205, as will be addressed. On the interior of the rim 204, the lower member 40 can include an attachment portion 206 for attaching to a portion of the upper member 30. For example, the interior of the rim 204 can include a threaded surface to interact with a threaded surface of the upper member 30. The interior of the rim 204 can also include an annular notch 207, as shown in FIG. 21, which can be snap fit onto the upper member 30. Still further, the rim 204 of the lower member 40 can be sized at least partially larger than an area of the upper member 30 so as to provide a friction fit between the members 30, 40. Other methods of connecting the members 30, 40 such that they encapsulate or otherwise house a product therein are to be appreciated and considered part of the disclosure. In addition, the rim 204 can include sealing rings 208 formed therein and/or thereon to aid in sealing the members to one another.

As mentioned, the exterior face 203 of the screen 200 can include a projecting annular rib 205 extending generally in the opposite direction of that of the rim 204. The rib 205 can be positioned at an outer diameter of the member 40, or spaced inward therefrom. The rib 205 can be used to attach a cover, lid, or other component to substantially close off, at least temporarily, access to the interior of the device 12 through the screen 200. For example, the component can be a dust cover, lid, or other components that can be temporarily affixed to the lower member 40 to substantially cover the screen portion 200 thereof, such as during transport and/or storage of the device 12. This can be the time before the device 12, including the product stored therein, is to be used, so as to provide a protective element for a user of the device, such as to protect the user from unwanted contact with the product inside. Therefore, a dust cover or other cover can be affixed, such as by heat sealing, adhering, welding (e.g., ultrasonic or otherwise), snap fit, friction fit, or the like to the member 40. For example, according to some aspects, the rib 205 can include an outward taper 209 that can engage a snap bead of a dust cover for temporarily affixing the cover to the member.

The lower member as shown in FIGS. 16-21, similarly to those shown and described herein, can comprise HDPE or other polymers.

Integrating the screen into the lower member 40 provides numerous advantages. For example, as will be understood, the configuration of the apertures comprising the screen (including, but not limited to, size, shape, number, angle, etc.) can affect the amount of fluid passing through to contact a product stored within. Therefore, choosing a configuration of screen can aid in providing a more consistent solution based upon the amount of product in contact with the fluid. Integrating the screen into the lower member 40 provides for greater flexibility in changing the configuration based upon such conditions including, but not limited to, type of product being dissolved/mixed by solution, desired concentration levels, changes in fluid (temperature, flow rate, etc.), changes in room climate (temperature, humidity, amount of light, etc.), and other external factors that could affect the concentration obtained. Therefore, different covers with varying screen configurations could be swapped in and out as needed. Furthermore, if a product is going to be used in a known location with a known climate, or with a known solvent, the screen can be selected upon packaging of the product. The entire device 12 will not need to be replaced, and instead, a different member 40 with a different screen can be replaced.

For example, studies have shown that varying the screen configuration can also the amount of solvent contacting the product stored within the device. This includes varying the size of the apertures in the screen, as well as varying the height of the rib 205, which can vary the distance between the fluid source and the product within the device 12.

Example 1

A product of approximated 4000 grams was contacted with a fluid passing through lower members having integrated screens with varying configurations. The screen sizes included (1) apertures sized approximately ¼-inch openings, with a 0.15-inch rib; (2) apertures sized approximately ¼-inch with a 0.08-inch rib; and (3) screen apertures of ½-inches with a 0.15-inch rib. A fourth run was done with no screen at all. A number of dispenses contacting the product with a set amount of fluid was done to determine how many dispenses were needed to erode the approximately 4000 grams of product. The dispenses comprised a 1-second dispensement every 90 seconds. With no screen, the product was eroded in approximately 550 dispenses. The ½-inch screen and 0.15-inch rib eroded the product in approximately 650 dispenses. The ¼-inch screen with 0.15-inch rib eroded the product in approximately 750 dispenses. Finally, the ¼-inch screen with 0.08-inch rib eroded just less than 4000 grams of product with approximately 1050 dispenses.

Example 2

Another test was completed with a product being contacted with a fluid to determine the number of dispenses required to erode and dispense approximately 3500 grams of the product, with the variables including: (1) no screen used; (2) a screen with ¼-inch apertures and a 0.15-inch rib; and (3) a screen with ¼-inch apertures and a 0.15-inch rib providing distance from the fluid source. Again, the product was sprayed with a 1-second dispensement every 90 seconds. The test showed that the approximately 3500 grams of product were eroded with approximately 140 dispenses using no screen, approximately 400 dispenses using the screen with ¼-inch apertures, and approximately 775 dispenses using the screen with ¼-inch apertures and a 0.15-inch rib.

This data clearly shows that both the screen aperture size and the distance between the screen and the product can have a profound effect on the erosion rate of the product by the fluid. This can be known as adjusting the flow of water via the screen aperture size, shape, number, and/or distance from the fluid/liquid dissolvent source.

Therefore, it is contemplated that the screen configurations be generally infinite in variability to provide for a desired amount of product to be eroded to provide for a desired concentration and to maximize the life of the product. This will optimize efficiency to provide cost savings and aid in the use of the device 12.

Still further, it should be appreciated that the variation of the screen, including the size and shape of the apertures, as well as varying the distance between the screen and the fluid/liquid source, can be utilized with any of the concepts as has been shown and/or described in the present disclosure. For example, it does not matter if the screen is integrated with one of the first or second portions of the device, or if it is simply positioned within the device as a separate member, the ability to vary the configurations of the screen will provide for flexibility and variability for determining the desired contact between a dissolving fluid and the product stored therein.

The disclosure is not to be limited to the particular embodiments described herein. In particular, the disclosure contemplates numerous variations in the type of ways in which embodiments of the disclosure can be applied the packaging and dispensing of solid chemical agents. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

In addition, it should be appreciated that the device of the present disclosure can be utilized with generally any and all types of chemical products. This includes, but should not be limited to, solid products, pellets, powders, granules, semi-solids, liquids, and/or some combination thereof.

The previous detailed description is of a small number of embodiments for implementing the disclosure and is not intended to be limiting in scope. The following claims set forth a number of the embodiments of the disclosure with greater particularity.

What is claimed is:

1. A device for packaging a solid chemical product and dispensing said chemical product from a container, the device comprising:

a first portion comprising a sidewall including a first portion of a first perimeter;

a second portion connected to the first portion via an annular rim of the second portion at least partially surrounding and interacting with an annular portion of the first portion, the second portion comprising a sidewall with a first portion having a first perimeter; and a support member positioned within the first and/or second portion and adapted to support the solid chemical product within said device and to orient and maintain a preferred distance between the solid chemical product and a spray nozzle of the container;

wherein the device is positioned at least partially within the container;

wherein one or both of the first and second portions include a sloped surface extending inward towards an axis of the device and eliminating at an opening; and wherein the first portion is an upper portion and the second portion is a lower portion having the sloped surface, said device further comprising:

one or more locking protrusions associated with the lower portion; and one or more locking tabs associated with the upper portion, each of the one or more locking tabs adapted to connect to one of the one or more locking protrusions to secure the upper portion to the lower portion.

2. The device of claim 1, further comprising:

a lip extending inwardly from the first perimeter of the sidewall of the lower portion and adapted to create an interference fit with a screen.

3. The device of claim 1, further comprising:

a handle connected to a top surface of the upper portion; and a cap removably connected to the opening of the lower portion.

4. The device of claim 1, further comprising:

a lip extending inwardly from the first perimeter of the sidewall of the lower portion and adapted to create an interference fit with a screen.

5. The device of claim 1, further comprising:

a handle connected to a top surface of the upper portion; and a cap removably connected to the opening of the lower portion.

6. The device of claim 1, wherein the sidewall of the upper portion is a cylinder, wherein the sidewall of the lower portion is a cylinder, and further wherein the sloped surface is the frustum of a cone.

7. The device of claim 1, further comprising:

a film removably connected to the opening of the lower portion, the film having an adhesive.

8. A method for packaging a dissolvable chemical product and dispensing said chemical product, the method comprising the steps of:

providing a container having a housing, a screen within the housing, and a terminal opening within the housing, said container including a first portion and a second portion, and wherein the second portion including an annular rim at least partially surrounding and interacting with an annular portion of the first portion;

installing the product onto the screen;

placing the container within a liquid dispensing system, wherein the terminal opening is proximate to a spray nozzle of the liquid dispensing system;

spraying a liquid against the dissolvable chemical product;

dispensing a chemical solution from the container to the liquid dispensing system;

providing a first set of locking features on the housing;

providing a second set of counterpoising locking features on the housing; and engaging the first set of locking features and the second set of counterpoising locking features.

9. The method of claim 8, further comprising the steps of:

providing a flexible enclosure;

enclosing a portion of the housing and the product with the flexible enclosure;

applying heat to the flexible enclosure; and shrinking the flexible enclosure.

10. A device for packaging a solid chemical product and dispensing said chemical product from a container, the device comprising:

a first portion comprising a sidewall including a first portion of a first perimeter; and a second portion connected to the first portion via an annular rim of the second portion at least partially surrounding and interacting with an annular portion of the first portion, the second portion comprising a sidewall with a first portion having a first perimeter and including a screen integrated with the second portion;

wherein the device is positioned at least partially within the container;

wherein the screen of the second portion comprises a plurality of apertures;

wherein the annular rim of the second portion extends generally perpendicular to the screen;

said annular rim including an interior threaded surface for attaching to a threaded portion of the first portion of the device.

11. The device of claim 10, wherein the second portion comprises an annular rib extending away from the screen in a direction generally opposite the annular rim.

12. The device of claim 11, further comprising a cover operatively attached to the second portion for covering the screen.

13. The device of claim 12, wherein the cover comprises a dust cover operatively attached to an annular rib.

14. The device of claim 13, wherein the cover is sealably connected to the second portion.

15. The device of claim 14, wherein the sealably connection comprises:

a. a heat seal;

b. an adhesive; or c. a weld.

* * * * *